United States Patent
Lu et al.

(10) Patent No.: US 7,775,836 B2
(45) Date of Patent: Aug. 17, 2010

(54) CHIP CARD HOLDER AND PORTABLE ELECTRONIC DEVICE USING THE SAME

(75) Inventors: Jun Lu, Shenzhen (CN); De-Hua Liu, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 12/420,921

(22) Filed: Apr. 9, 2009

(65) Prior Publication Data

US 2010/0066218 A1     Mar. 18, 2010

(30) Foreign Application Priority Data

Sep. 18, 2009    (CN)  ................. 2008 1 0304547

(51) Int. Cl.
*H01R 24/00*    (2006.01)
(52) U.S. Cl. ..................... 439/630; 439/327
(58) Field of Classification Search ............. 439/630, 439/327
See application file for complete search history.

(56) References Cited

U.S. PATENT DOCUMENTS

| | | | |
|---|---|---|---|
| 6,761,591 B1 * | 7/2004 | Zhou ........................... | 439/630 |
| 6,831,977 B2 * | 12/2004 | Kiernan et al. ......... | 379/433.09 |
| 6,892,078 B2 * | 5/2005 | Sakaguchi et al. .......... | 455/558 |
| 6,947,767 B2 * | 9/2005 | Haga et al. ................. | 455/558 |
| 6,969,282 B2 * | 11/2005 | Liu ............................ | 439/630 |
| 7,131,871 B1 * | 11/2006 | Zuo et al. .................... | 439/630 |
| 7,160,131 B1 * | 1/2007 | Zuo et al. .................... | 439/331 |
| 7,244,135 B2 * | 7/2007 | Chen et al. ................. | 439/327 |
| 7,264,495 B2 * | 9/2007 | Zuo et al. .................... | 439/326 |
| 7,306,491 B1 * | 12/2007 | Wei ............................ | 439/630 |
| 7,371,088 B2 * | 5/2008 | Chen et al. ................. | 439/159 |
| 7,407,414 B2 * | 8/2008 | Zuo et al. .................... | 439/630 |
| 7,445,510 B2 * | 11/2008 | Feng et al. ................. | 439/630 |
| 7,447,522 B2 * | 11/2008 | Kumazawa et al. ........ | 455/558 |
| 7,494,360 B2 * | 2/2009 | Zhan et al. ................. | 439/326 |
| 7,583,514 B2 * | 9/2009 | Zuo et al. .................... | 361/801 |
| 2003/0156388 A1 * | 8/2003 | Christensen et al. ........ | 361/729 |
| 2005/0106925 A1 * | 5/2005 | Liu ............................ | 439/366 |
| 2006/0281356 A1 * | 12/2006 | Zuo et al. .................... | 439/325 |
| 2006/0286847 A1 * | 12/2006 | Zuo et al. .................... | 439/331 |
| 2007/0128914 A1 * | 6/2007 | Yang et al. ................. | 439/326 |
| 2007/0167080 A1 * | 7/2007 | Chen et al. ................. | 439/630 |
| 2007/0224871 A1 * | 9/2007 | Zhan et al. ................. | 439/327 |
| 2007/0293092 A1 * | 12/2007 | Seo ............................ | 439/630 |
| 2009/0035977 A1 * | 2/2009 | Chen et al. ................. | 439/326 |

* cited by examiner

*Primary Examiner*—Ross N Gushi
(74) *Attorney, Agent, or Firm*—Steven M. Reiss

(57) ABSTRACT

A chip card holder used to fixing a chip card comprises a housing defining a receiving slot configured for receiving a chip card therein; a stop cushion for assembly in the receiving slot for resisting against the chip card to restrict movement of the chip card in the receiving slot. The chip card can avoid moving in the receiving slot and enhance the stability of portable electronic devices.

15 Claims, 5 Drawing Sheets

CHIP CARD HOLDER AND PORTABLE ELECTRONIC DEVICE USING THE SAME

BACKGROUND

1. Technical field

The present disclosure relates to chip card holders and, particularly, to a chip card holder used in a portable electronic device.

2. Description of Related Art

Portable electronic devices such as mobile phones and personal digital assistants (PDAs) are widely used. The portable electronic devices typically use a chip card (e.g., SIM card) for storing information. Chip card holders hold/secure the chip card within the portable electronic devices.

In use, a chip card is mounted into the receiving slot. A battery is placed in a chamber and resists against the chip card, thereby preventing the chip card from moving out from the receiving slot.

However, different batteries may have even tiny differences in size. When a relatively smaller sized battery is placed into the chamber, the battery may not resist against the chip card tightly enough. This results in movement of the chip card in the receiving slot. Such movements may cause poor electrical connection to a connector of the portable electronic device, and thus call quality thereof is reduced. In addition, the battery may hit the chip card when the portable electronic device is heavily shocked or vibrated. Thus, the chip card can be damaged by movements of the battery.

Therefore, there is room for improvement within the art.

BRIEF DESCRIPTION OF THE DRAWINGS

Many aspects of the chip card holder and the portable electronic device using the chip card holder can be better understood with reference to the following drawing. The components in the drawing are not necessarily drawn to scale, the emphasis instead being placed upon clearly illustrating the principles of chip card holder and the portable electronic device using the chip card holder. Moreover, in the drawing like reference numerals designate corresponding parts throughout the several views.

DETAILED DESCRIPTION OF THE EMBODIMENTS

Figure 1:
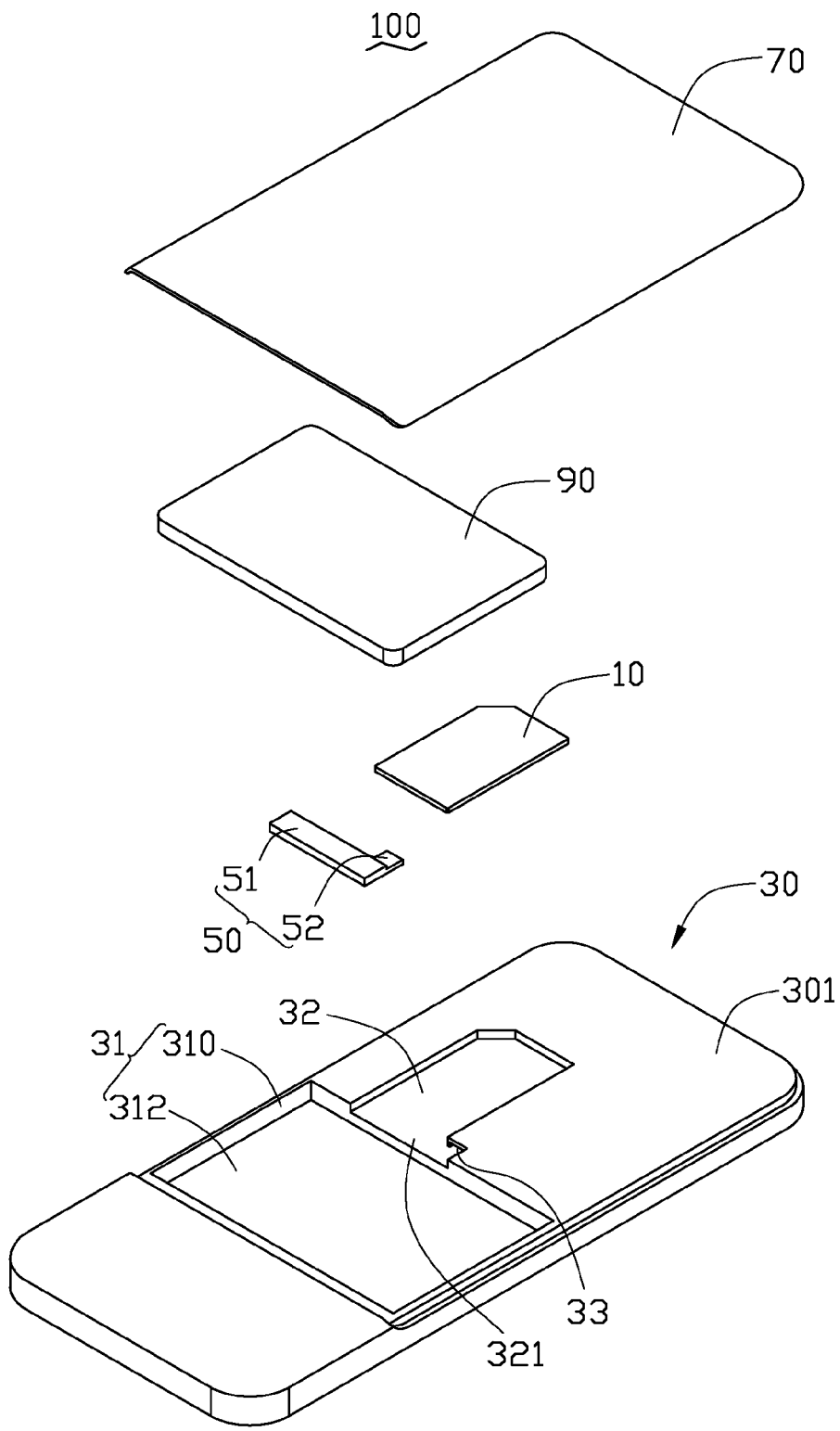
FIG. 1 is an exploded, isometric view of a chip card holder and a battery according to a first exemplary embodiment.

The chip card holder of the present embodiment is suitable for portable electronic devices, such as, mobile phones, PDAs (personal digital assistants), palm computers and other devices which incorporate a chip card and a battery. FIG. 1 shows a first exemplary chip card holder 100 used to hold a chip card 10. The chip card holder 100 includes a housing 30, a stop cushion 50 detachably assembled in the housing 30 and a cover 70 latching to the housing 30.

The housing 30 is often a part of a portable electronic device for receiving electronic components of the portable electronic device. The housing 30 has a top surface 301, a chamber 31, and a receiving slot 32. The chamber 31 and the receiving slot 32 both are recessed in the top surface 301 and adjacent to each other. The chamber 31 is enclosed by four sidewalls 310 and a bottom wall 312, and receives a battery 90. The receiving slot 32 receives the chip card 10 and the stop cushion 50. The receiving slot 32 has an opening 321 defined in a sidewall 310, thereby communicating the chamber 31 with the receiving slot 32. A locating chamber 33 is defined both adjacent to and communicates with the chamber 31 and the receiving slot 32. The locating chamber 33 is used to locate the stop cushion 50.

The stop cushion 50 is L-shaped and can be made of fabric, rubber, or other resilient materials configured for buffering impact between the battery 90 and the chip card 10. The stop cushion 50 includes a main body 51 and a position portion 52 extending from an end of the main body 51. The position portion 52 can be received in the locating chamber 33 and is configured for latching the main body 51 into the receiving slot 32.

The cover 70 is a battery cover of the portable electronic device. The cover 70 is configured to be detachably mounted to the top surface 301 of the housing 30, and covers at least the battery 90 and the chip card 10.

Figure 2:
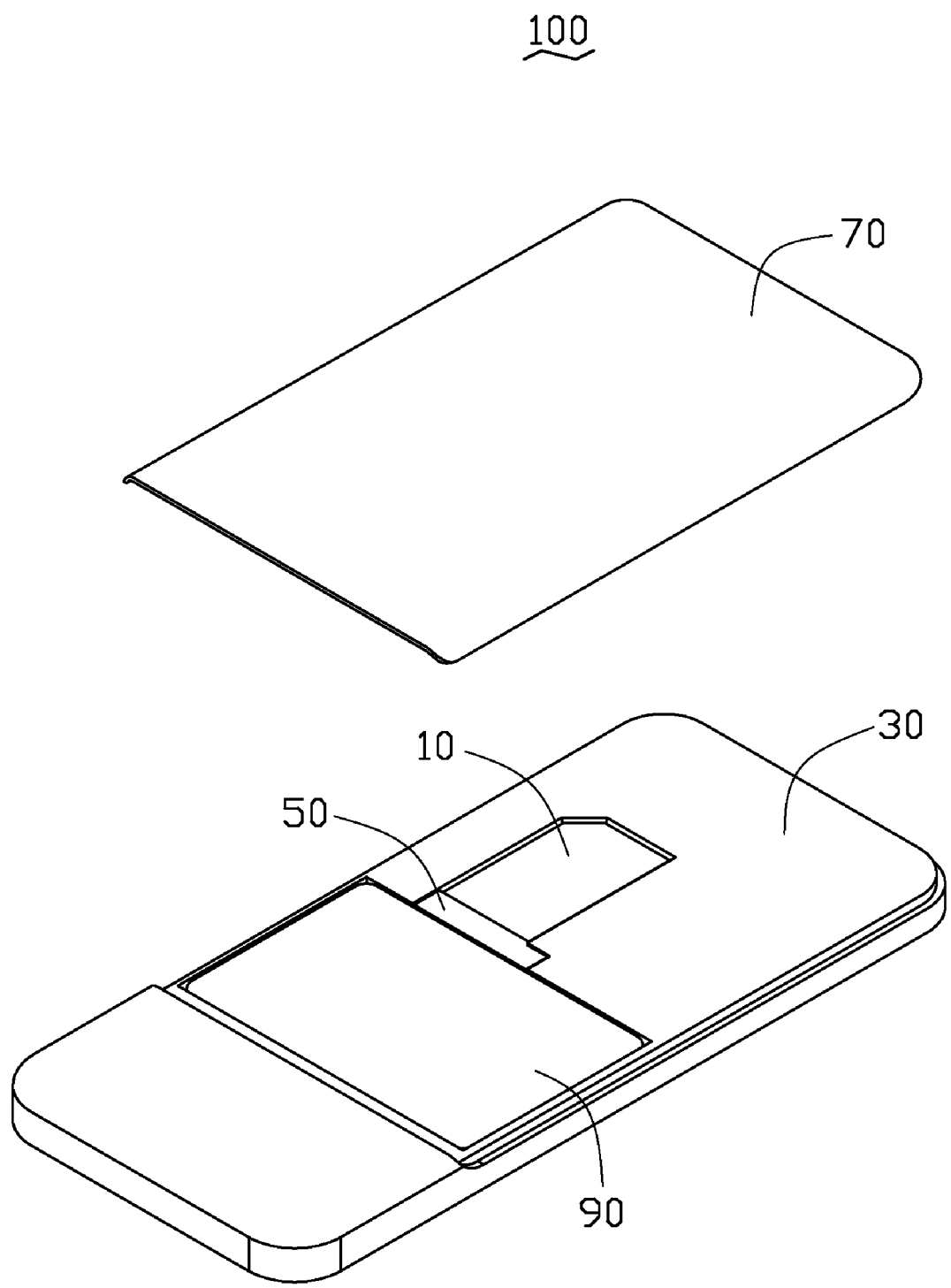
FIG. 2 is an isometric, assembled view of the chip card holder and the battery shown in FIG. 1.

Referring to FIG. 2, in use, the chip card 10 is placed into the receiving slot 32. The position portion 52 and the main body 51 are respectively inserted into the locating chamber 33 and the receiving slot 32 to block the opening 321 of the receiving slot 32. The main body 51 resists against the chip card 10 to tightly secure the chip card 10 in the receiving slot 32. The battery 90 is placed into the chamber 31 and resists against the stop cushion 50 to prevent the cushion 50 from moving out from the receiving slot 32. The cover 70 latches to the housing 30 for fixing the chip card 10 and the battery 90 in the portable electronic device.

Since the stop cushion 50 is made of resilient materials, even a battery 90 relative small in size can be mounted into the chamber 33 and rightly resist against the stop cushion 50 to retain the chip card 10 in the receiving slot 32, the chip card 10 still can be tightly retained in the receiving slot 32 under the resilient force of the stop cushion 50. In addition, the stop cushion 50 can protect the chip card 10 from impact of the battery 90 when the portable electronic device is heavily shocked/vibrated.

Figure 3:
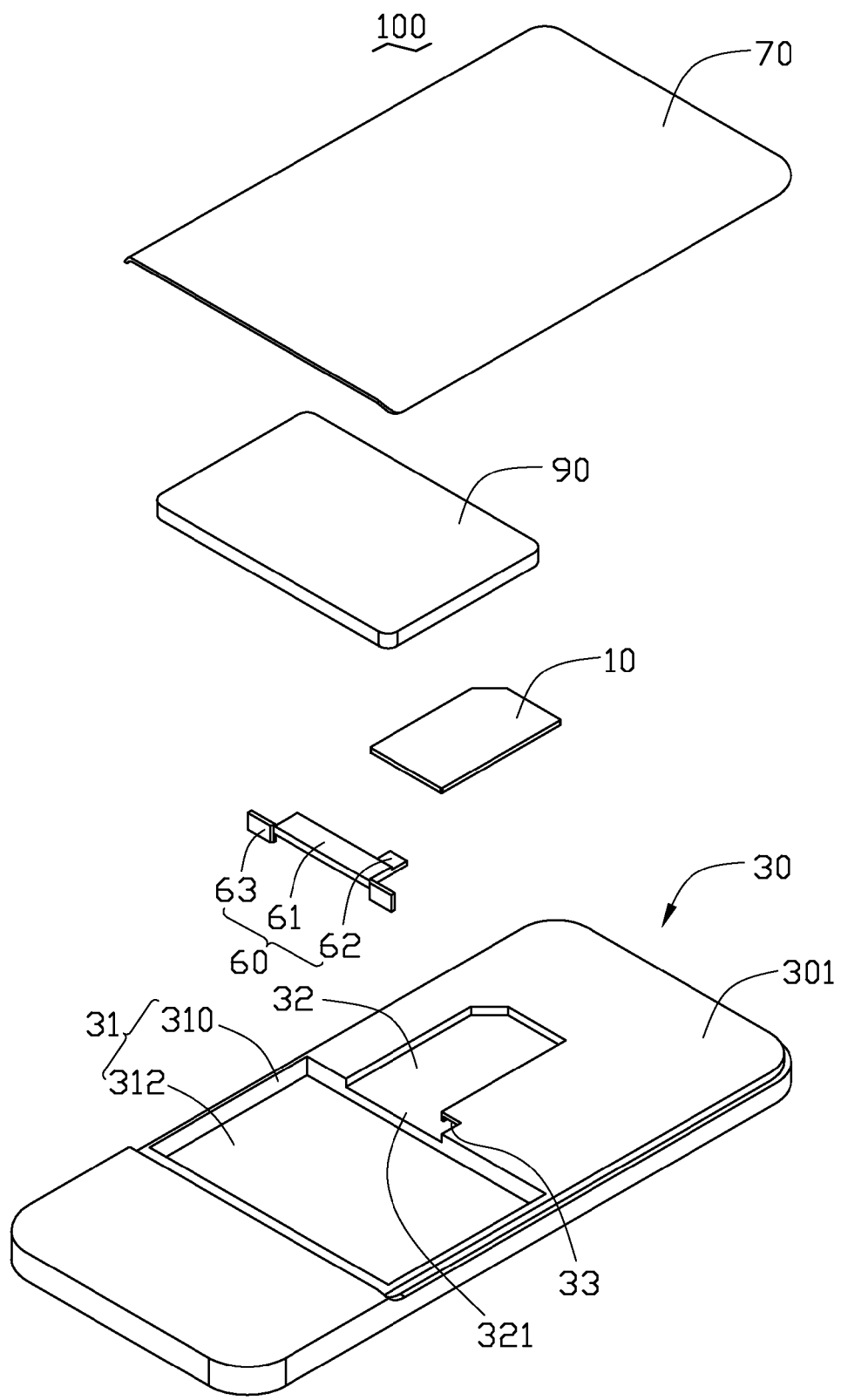
FIG. 3 is an isometric, assembled view of the chip card holder and the battery assembled in the chip card holder according to a second exemplary embodiment.

FIG. 3 shows a second exemplary embodiment of a stop cushion 60 detached from the housing 30. The stop cushion 60 can be made of fabric, rubber, or other resilient materials configured for buffering impact between the battery 90 and the chip card 10. The stop cushion 60 includes a main body 61, a position portion 62, and two buffer portions 63. The position portion 62 extends from an end of the main body 61, thereby the position portion 62 and the main body 61 form a L-shaped structure. The position portion 62 is configured to be received in the locating chamber 33 to latch the main body 61 in the receiving slot 32. The buffer portions 63 are respectively positioned at two opposite ends of the main body 61. When the main body 61 latches into the receiving slot 32, the buffer portions 63 resist against the sidewalls 310.

Figure 4:
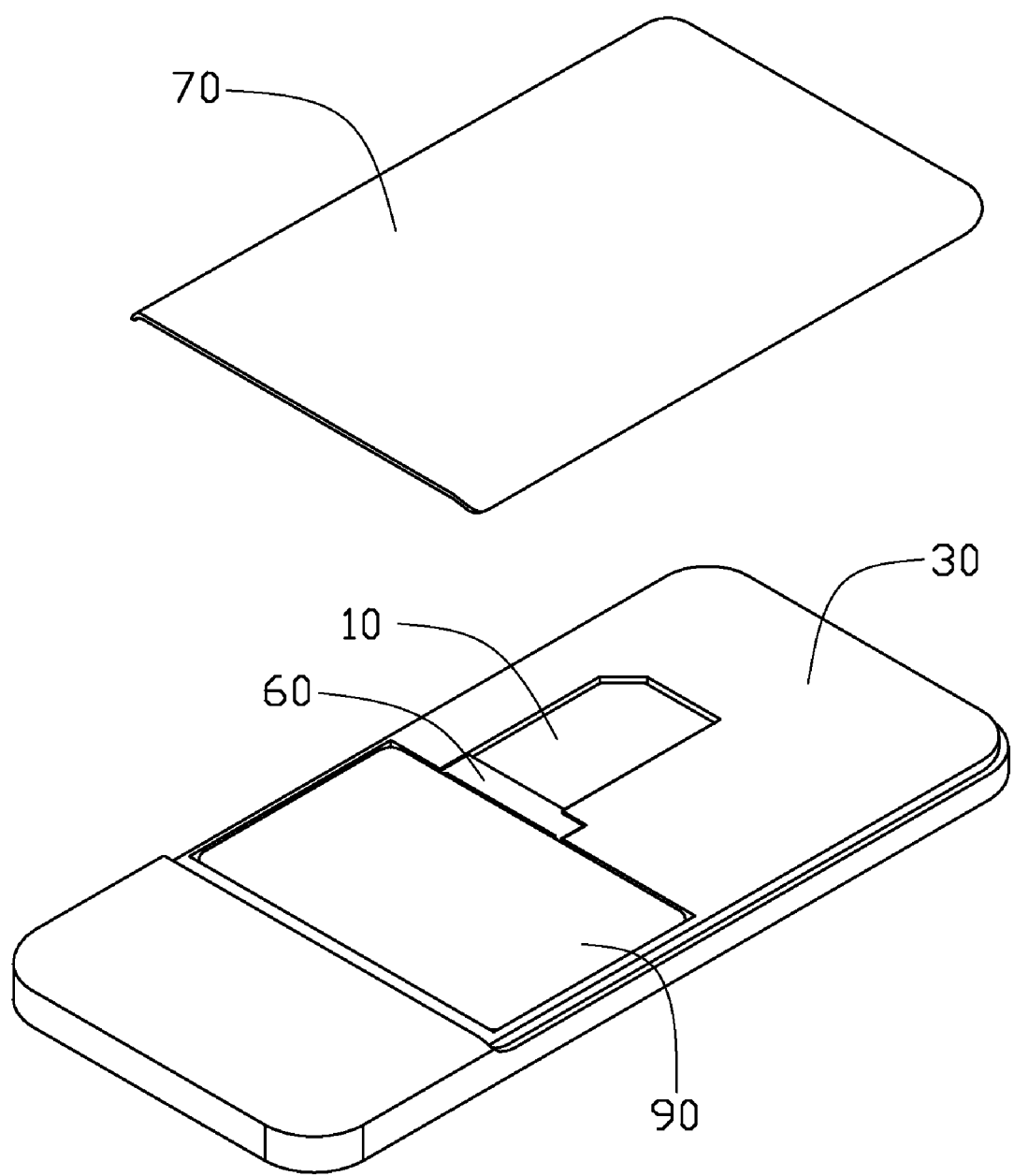
FIG. 4 is an isometric, assembled view of the chip card assembled in the chip card holder shown in FIG. 3.

Referring to FIG. 4 together, in use, the chip card 10 is placed into the receiving slot 32. The position portion 62 is inserted into the locating chamber 33 and the receiving slot 32 to block the opening 321 of the receiving slot 32. Meanwhile, the buffer portions 63 approach the sidewalls 310. The battery 90 is placed in the chamber 31 resists against the buffer portions 63 to preventing the cushion 50 moving out from the receiving slot 32. The cover 70 latches to the cover 30 for fixing the chip card 10 and the battery 90 in the portable electronic device.

Figure 5:
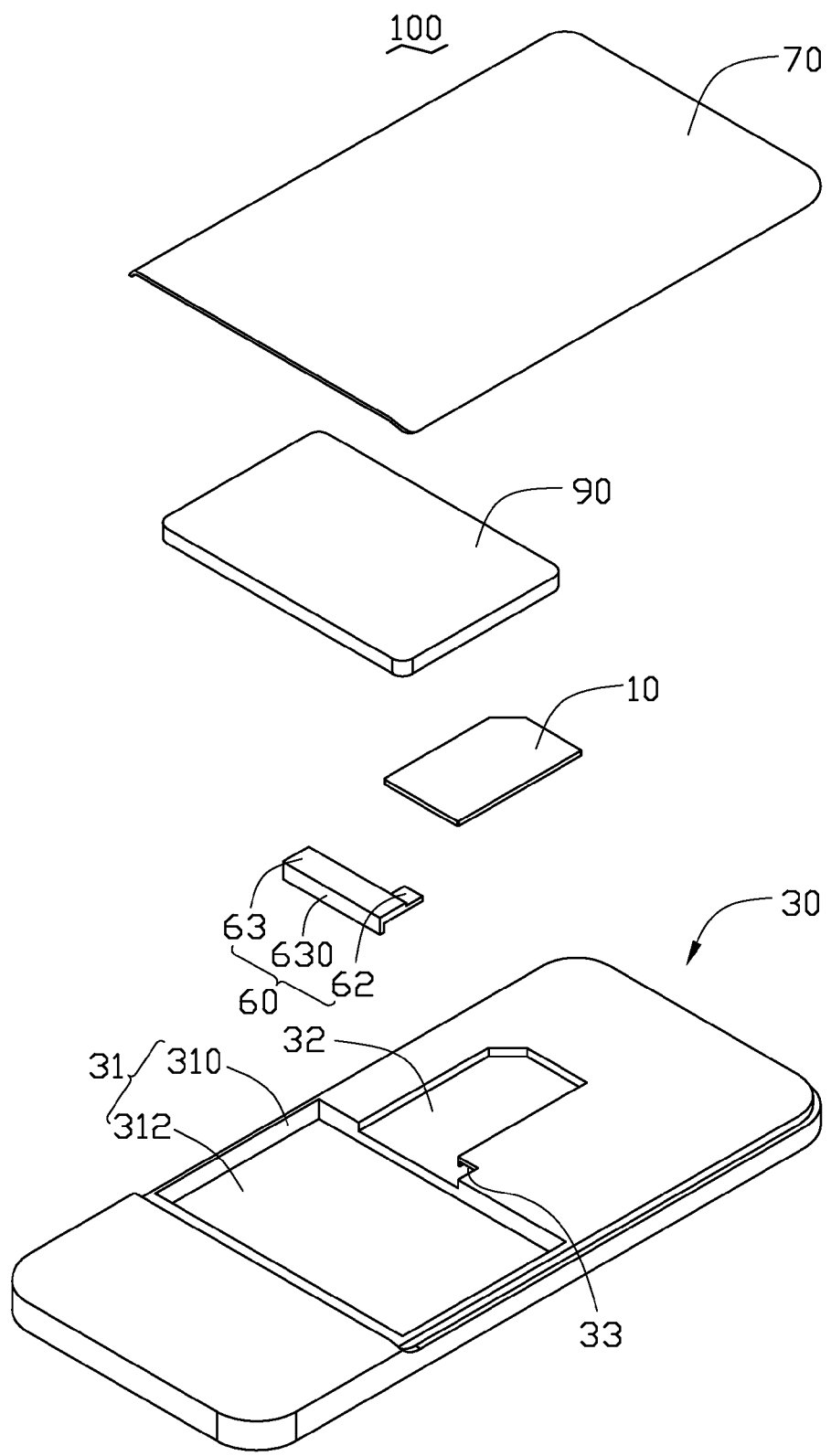
FIG. 5 is an exploded, isometric view of the chip card holder and the battery assembled in the chip card holder according to a third exemplary embodiment.

Referring to FIG. 5, it is to be understood, the buffer portions 63 can combine into one buffer portion 630. Namely, the buffer portion 630 perpendicularly extends from the main body 61.

It is to be understood that the locating chamber 33 and the position portion 52 can be omitted. Accordingly, the stop cushion 50 can be fixed in the receiving slot 32 by glue.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of sections within the principles of the invention to the full extent indicated by the broad general meaning of the terms, in which the appended claims are expressed.

What is claimed is:

1. A chip card holder, comprising:
   a housing defining a receiving slot and a locating chamber communicating with the receiving slot; the receiving slot configured for receiving a chip card therein; and
   a stop cushion for assembly in the receiving slot for resisting against the chip card to restrict movement of the chip card in the receiving slot, the stop cushion comprising a main body and a position portion extending from an end of the main body;
   wherein the position portion is detachably received in the locating chamber configured for latching the main body into the receiving slot.

2. The chip card holder as claimed in claim 1, wherein the housing defines a chamber for receiving a battery, the chamber is positioned adjacent to the receiving slot in a manner that the stop cushion is positioned between the chamber and the receiving slot.

3. The chip card holder as claimed in claim 2, wherein the stop cushion further includes at least one buffer portion extending from an end of the main body, the at least one buffer portion resists against a sidewall of the chamber.

4. The chip card holder as claimed in claim 1, wherein the stop cushion is made of resilient material.

5. The chip card holder as claimed in claim 4, wherein the stop cushion fixes in the receiving slot by glue.

6. The chip card holder as claimed in claim 1, wherein the chip card holder further includes a cover mounted to the housing.

7. A portable electronic device, comprising:
   a housing defining a receiving slot and a locating chamber communicating with the receiving slot; the receiving slot configured for receiving a chip card therein; and
   a stop cushion assembled in the receiving slot for resisting against the chip card to restricting movement of the chip card; the stop cushion includes a main body and a position portion extending from an end of the main body;
   wherein the position portion is detachably received in the locating chamber configured for latching the main body into the receiving slot.

8. The portable electronic device as claimed in claim 7, wherein the housing defines a chamber for receiving a battery, the chamber is positioned adjacent to the receiving slot in a manner that the stop cushion is positioned between the chamber and the receiving slot.

9. The portable electronic device as claimed in claim 8, wherein the stop cushion further includes at least one buffer portion extending from an end of the main body, the at least one buffer portion resists against a sidewall of the chamber.

10. The portable electronic device as claimed in claim 7, wherein the stop cushion is made of resilient material.

11. The portable electronic device as claimed in claim 10, wherein the stop cushion fixes in the receiving slot by glue.

12. The portable electronic device as claimed in claim 7, wherein the portable electronic device further includes a cover mounted to the housing.

13. A chip card holder, comprising:
    a housing defining a receiving slot and a locating chamber communicating with the receiving slot; the receiving slot configured for receiving a chip card therein; and
    a stop cushion detachably assembled in the receiving slot and the locating chamber for resisting against the chip card to restrict movement of the chip card in the receiving slot.

14. The chip card holder as claimed in claim 13, wherein the stop cushion includes a main body and a position portion extending from an end of the main body; the position portion is detachably received in the locating chamber, the main body is latched in the receiving slot.

15. The chip card holder as claimed in claim 14, wherein the housing defines a chamber for receiving a battery, the chamber is positioned adjacent to the receiving slot, the stop cushion further comprises at least one buffer portion extending from an end of the main body, the at least one buffer portion resists against a sidewall of the chamber.

* * * * *